US008082002B2

(12) United States Patent
Heinonen et al.

(10) Patent No.: US 8,082,002 B2
(45) Date of Patent: Dec. 20, 2011

(54) CONTAINER UNIT, MESSAGE SWITCHING EQUIPMENT, ROUTING METHOD, ROUTING DIRECTORY, AND SYSTEM FOR MONITORING CONTAINERS

(75) Inventors: Tero Heinonen, Helsinki (FI); Pauli Noronen, Espoo (FI)

(73) Assignee: Cargotrax Oy, Vantaa (FI)

( * ) Notice: Subject to any disclaimer, the term of this patent is extended or adjusted under 35 U.S.C. 154(b) by 977 days.

(21) Appl. No.: 11/871,408

(22) Filed: Oct. 12, 2007

(65) Prior Publication Data

US 2008/0090523 A1 Apr. 17, 2008

(30) Foreign Application Priority Data

Oct. 12, 2006 (EP) .................................... 06397024

(51) Int. Cl.
*H04M 1/00* (2006.01)

(52) U.S. Cl. ................. 455/552.1; 455/41.2; 455/554.2; 455/553.1

(58) Field of Classification Search ............... 455/552.1, 455/41.2, 554.2, 553.1, 556.1, 560, 403, 455/422.1, 446, 449
See application file for complete search history.

(56) References Cited

U.S. PATENT DOCUMENTS 6,795,823 B1 9/2004 Aklepi et al.
7,529,561 B2 * 5/2009 Heinonen et al. .......... 455/552.1
2006/0109106 A1 5/2006 Braun
2006/0164239 A1 7/2006 Loda

FOREIGN PATENT DOCUMENTS

WO WO2006/053566 A1 5/2006

OTHER PUBLICATIONS

U.S. Appl. No. 11/468,972, filed Aug. 31, 2006, to present applicant.

* cited by examiner

*Primary Examiner* — Eugene Yun
(74) *Attorney, Agent, or Firm* — Shalom Wertsberger; Saltamar Innovations

(57) ABSTRACT

The invention includes a message switching equipment for transmitting messages between container units placed in containers and a monitoring server. The message switching equipment comprises at least a container unit 201, a gateway unit 202 providing communication links 203, and a message handler 204 which is coupled to the monitoring server 205. The message switching equipment is adapted to send a first message 206 from the container unit 201 via a cellular network 207 to the message handler 204 in response to an event relating to the container. In more detail, the first message 206 is sent through a cellular network radio 208 of the container unit 201. The equipment is further adapted to receive through a short range radio 209 of the container unit 201 a second message 210 originated from one of the container units and transmit the second message 210 from the container unit 201 via the cellular network 207 to the message handler 204. The equipment is further adapted to receive through a short range radio 211 of the gateway unit 202 a third message 212 and transmit the third message through the gateway unit 202 to the message handler 203.

5 Claims, 4 Drawing Sheets

CONTAINER UNIT, MESSAGE SWITCHING EQUIPMENT, ROUTING METHOD, ROUTING DIRECTORY, AND SYSTEM FOR MONITORING CONTAINERS

FIELD OF THE INVENTION

The invention relates generally to shipping and monitoring of containers.

BACKGROUND OF THE INVENTION

The invention concerns partly the same aspects as the applicant's previous U.S. patent application Ser. No. 11/468,972, filed Aug. 31, 2006, which is hereby incorporated by reference in its entirety.

A container can be considered as a box made of steel. Instead of steel other sufficiently strong materials could be also used. There are five common standard lengths for containers: 20 ft (6.1 m), 40 ft (12.2 m), 45 ft (13.7 m), 48 ft (14.6 m) and 53 ft (16.2 m). The container capacity is measured in twenty-foot equivalent units (TEU). A twenty-foot equivalent unit is a measure of containerized cargo capacity equal to one standard 20 ft (length)×8 ft (width)×8 ft 6 in (height) container. In metric units this is 6.10 m (length)×2.44 m (width)×2.59 m (height).

"Containerization" is a term related to logistics that changed freight handling in the 20th century. A basic idea of the containerization is that a mode of transportation of cargo must be easily transformed into another.

For example, if a container is placed in a train, the container can be moved from the train to a ship and from the ship to a truck. The container is usually lifted up many times from the ground and moved to another place during its transportation. For example, forklifts, portainer cranes, and other types of devices move the container. These devices may also place the container in a pile of containers. The above-mentioned length standards and other standards specified by ISO (international organization for standardization) simplify and speed up the handling of containers.

Containerization is widely used in sea transport and in cargo shipping. Today, worldwide approximately 90% of non-bulk cargo is transported by containers. The containers are stacked on transport ships that can carry up to 9,000 TEU and even larger ships are intended to be placed in use in the future.

In the following we discuss about the prior art related to the invention.

U.S. Pat. No. 6,795,823 describes a system for tracking articles and optimally routing them. The system processes variable factors such as weather, traffic, and available trucks, and generates an optimal route for an article. The system includes global positioning sensors placed in the trucks. In addition to these sensors, the trucks are equipped with modems which send position coordinates obtained from the global positioning sensors via a pager network to the system.

The system of U.S. Pat. No. 6,795,823 operates in land but not at sea. In principle, a container can be continuously tracked in land and at sea when the container includes a satellite locator, satellite transceiver and a satellite antenna, and the position coordinates obtained from the satellite locator are sent through the satellite transceiver and antenna to a tracking system. Typically this requires a clear line of sight from the container to the satellite. In practice, the container may need to be located a number of times during its transportation in such places that the satellite locator and/or the satellite transceiver and antenna are temporarily inoperative due to lack of the line of sight to the satellite.

In a ship, in a harbour, or in other stocking area the container may reside in the bottom layer of a large pile of containers and for that reason it is not possible to connect to the container through its satellite antenna.

Furthermore, a great number of containers are loaded in a ship in cargo holds. The cargo holds are entirely isolated sections of the ship which are made of steel, preventing all satellite connections to the containers.

One aspect related to connections is that satellite connections are expensive when comparing them to pager network connections or cellular network connections. This and other aspects are considered in U.S. patent application Ser. No. 10/994,781, published as US 2006/0109106 A1.

U.S. patent application Ser. No. 10/994,781 describes a monitoring system for a container. The system includes a central computer and an onboard device attached to the container. The onboard device includes a satellite modem and one or more sensors for sensing the conditions of the container. If a sensor of the onboard device alerts, the alert is sent through the satellite antenna to the central computer of the system.

As an example, a door sensor connected to the onboard device alerts, if someone breaks in into the container.

In one embodiment, the onboard device of U.S. patent application Ser. No. 10/994,781 further includes a short-range wireless communication module and/or a cellular telephone modem. Therefore the onboard device can alternatively send its alert via a short-range wireless network or via a cellular network to the central computer. In addition, the system may include fixed communication devices for creating communications hotspots.

A communications hotspot receives through its short-range wireless communication module an alert sent by the onboard device and transmits the alert to the central computer. The communications hotspot can be used in a ship, in a harbour, or in other area where containers are piled and the radio environment is very challenging.

The communications hotspot solves some of the problems related to the connections to the containers, but not all of them.

One drawback of the prior art is that container monitoring systems are too unreliable in a challenging radio environment. The communications hotspots work poorly when containers are stacked in a large group. In such group it is common that containers cannot reliably communicate with the hotspot or with any network.

The use of different types of communication networks solves some of the problems related to the connections to the containers, but not all of them, because "a connection set-up logic" is missing.

Another drawback of the prior art is that the connection set-up logic for different types of communication networks is not properly specified.

SUMMARY OF THE INVENTION

One aspect of the invention is that it provides solutions to the above-mentioned drawbacks of the prior art.

In this patent application we use a term "container unit" instead of the above-mentioned term "onboard device" and we use a term "monitoring server" instead of the above-mentioned term "central computer".

Another aspect of the invention is that it provides "routing information" for the monitoring server so that the monitoring server is able to send a message to a certain container unit.

Another aspect of the invention is that it enables the building of a reliable end-to-end monitoring system. Then the location of containers and other conditions related to the containers can be continuously or almost continuously monitored.

Another aspect of the invention is that the containers to be monitored are equipped with such container units that are capable to co-operate with each other. The co-operation of the container units is especially important in challenging radio environments.

Another aspect of the invention is that the container unit performs on the basis of a connection set-up logic the following connection set-up attempts:

a connection through the short range radio directly to a gateway unit providing communication links between the container unit and the monitoring server, a connection through the short range radio to the gateway unit via at least one other container unit which is placed in another container, a connection through the cellular network radio to a base station of a cellular network, and a connection through the short range radio directly or via at least one other container unit to such container unit which is capable to communicate with the base station.

When any of the connection set-up attempts results in an available connection to the gateway unit or to the base station of the cellular network, the container unit sends its message through the available connection towards the monitoring server.

The preferred embodiment of the invention comprises the above-mentioned container unit, a message switching equipment, a routing method, a routing directory, and a system for monitoring containers.

The message switching equipment transmits messages between the monitoring server and the container units placed in containers. It comprises a container unit, one gateway unit providing communication links between the container unit and the monitoring server, and a message handler which is coupled to the monitoring server.

The operation of the message switching equipment can be described by an example containing three messages.

The message switching equipment is adapted to:

send a first message from the container unit via a cellular network to the message handler, receive through a short range radio of the container unit a second message which is originated from one of the container units and transmit the second message from the container unit via the cellular network to the message handler, receive through a short range radio of the gateway unit a third message which is originated from one of the container units and transmit the third message from the gateway unit to a message handler, and In addition, the equipment is adapted to receive the first, the second, and the third message at the message handler.

The method in accordance with the preferred embodiment routes a message from a message handler to a container unit as follows.

At the message handler, the method reads routing information from a memory, the routing information disclosing a transmission path to the container unit.

The method sends the message with the routing information from the message handler to a satellite phone number disclosed in the routing information when the routing information indicates that the transmission path includes a gateway unit which has the satellite phone number.

The method receives the message at the gateway unit.

The method performs a connection set-up through a short range radio of the gateway unit to the container unit and transmits the message from the gateway unit through the short range radio to the container unit when the connection set-up succeeds.

The routing directory in accordance with the preferred embodiment includes at least one data item comprising the following sub-items: a sub-item of "container unit", a sub-item of "transmission path", and a sub-item of "candidate container units".

The system for monitoring containers comprises a plurality of container units to be monitored and the above-described message switching equipment.

BRIEF DESCRIPTION OF THE DRAWINGS

The invention is described more closely with reference to the accompanying drawings, in which.

DETAILED DESCRIPTION OF THE INVENTION

The container unit is intended for end-to-end monitoring of a container. In other words, the container unit is used to monitor one container from the site of a sender of the container to the site of the recipient of the container. The container unit is placed in the container to be monitored, which means that the container unit is permanently or temporarily attached to the container.

Figure 1:
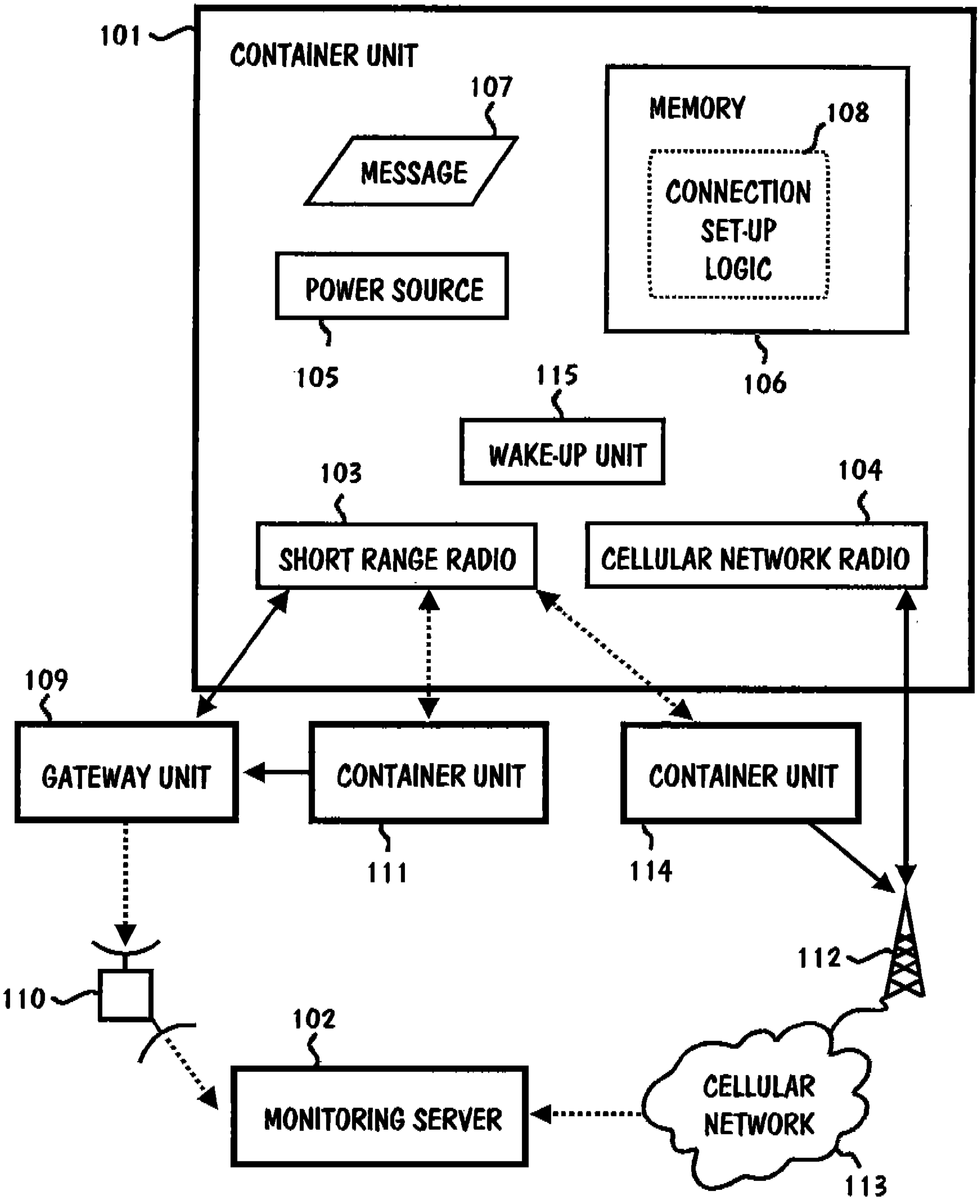
FIG. 1 shows a container unit in accordance with a preferred embodiment.

FIG. 1 shows the container unit in accordance with the preferred embodiment. The container unit 101 is capable to communicate with a monitoring server 102. It comprises a short range radio 103, a cellular network radio 104, a power source 105, and a memory 106.

The container unit 101 is adapted to form a message 107 in response to an event. This event relates to the container in which the container unit is placed. A sensor connected to the container unit detects certain events. Alternatively, the event is possibly initiated by a message which is sent from the monitoring server 102. Thus, in response to receiving this message, the container unit 101 forms the message 107.

The container unit 101 further comprises a connection set-up logic 108 stored in the memory 106.

The container unit is further adapted to perform on the basis of the connection set-up logic 108 the following connection set-up attempts: a) a connection through the short range radio 103 directly to a gateway unit 109 providing communication links 110, b) connection through the short range radio 103 to the gateway unit 109 via at least one other container unit 111 which is placed in another container, c) a connection through the cellular network radio 104 to a base station 112 of a cellular network 113, and d) a connection through the short range radio 103 directly or via at least one other container unit to such container unit 114 which is capable to communicate with the base station 112.

The communication links 110 between the container unit 101 and the monitoring server 102 are especially needed at sea where no cellular network is usable. The communication links 110 usually require use of at least one satellite. In addition to a satellite, the communication links may utilize the Internet.

The container unit 101 is further adapted to send the message 107 through an available connection towards the monitoring server 102 when any of the connection set-up attempts results in the available connection to the gateway unit or to the base station of the cellular network.

As described in the above, the connection set-up logic 108 defines at least four connection set-up attempts to be performed. The connection set-up logic 108 may further define in which order the connection set-up attempts are performed. The order is preferably: a), b), c), and lastly d).

The order of the connection set-up attempts may be fixed. Alternatively, the order may vary. In other words, the connection set-up logic 108 defines criteria for the order of the connection set-up attempts. The criteria include at least one of the following criteria: costs, latency, throughput, a number of hops, or a consumption of the power source.

Preferably, the short range radio 103 operates on at least one band which is included in the industrial, scientific and medical (ISM) bands.

The cellular network radio 104 preferably operates in at least one of the following networks: a TDMA (time division multiple access), a GSM (global system for mobile communications) network, a CDMA (code division multiple access) network, a FDMA (frequency division multiple access) network, or a UMTS (universal mobile telecommunications system) network.

The container unit 101 is connectable to at least one sensor. In addition or alternatively, the container unit 101 comprises a satellite locator, which means that it is connectable to a satellite locator or the satellite locator is included in the container unit.

The sensor connected to the container unit detects, for example, the following events: a door of the container is opened or the temperature inside the container is too low or two high. In addition to the door sensor and the temperature sensor, a number of other types of sensors can be connected to the container unit.

The satellite locator preferably operates in one of the following systems: GPS (global positioning system), EGNOS (european geostationary navigation overlay service), GLONASS (globalnaja navigatsionnaja sputnikovaja sistema), or Galileo.

Sometimes the container in which the container unit 101 is placed is located in such a site that the container unit cannot obtain a connection through its radios. For example, in a harbour the container may be located under a pile of containers and the container unit just runs out the energy of the power source 105, if it continues the connection set-up attempts.

In order to avoid running out the energy of the power source the container unit 101 is adapted to stop the connection set-up attempts when a number of the connection set-up attempts reaches a certain limit. The certain limit may be, for example, three unsuccessful connection set-up attempts after which the container unit tries again after a delay. Also this type of connection set-up policy may cause running out the energy, if the connection set-up attempts fails day after day.

In addition to the short range radio 103, the cellular network radio 104, the power source 105, and the memory 106, the container unit 101 may further comprise a wake-up unit 115. Utilizing the wake-up unit 115 the container unit 101 controls the use of the short range radio 103 and the cellular network radio 104.

The wake-up unit 115 is adapted to start the connection set-up attempts of the container unit 101 when the container in which the container unit is placed has moved. In other words, the wake-up unit has detected a movement of the container. For example, when the container is taken out from the pile of the containers and the container is on its route to a ship, the container unit 101 has a good chance to obtain a connection through the short range radio 103 or the cellular network radio 104 and send the message 107 through the connection. The container unit 101 would probably lost this chance, without the wake-up unit 115.

The wake-up unit 115 comprises an appropriate apparatus for detecting a movement of the container. The apparatus preferably includes at least one acceleration sensor. The movement detected by the wake-up unit occurs, for example, when the container is lifted up from the ground. The wake-up unit does not necessarily react to every possible movement. In more detail, the wake-up unit reacts to a movement only when container unit 101 is on a "waiting mode" because of unsuccessful connection set-up attempts. The wake-up unit may be so intelligent that it detects when the container is located in a ship sailing at sea and when the container is located at land. In other words, the wake-up unit is able to differentiate the movements caused by sea waves from the other types of movements.

The wake-up unit 115 is a general-purpose unit, thus it can be utilized in many types of environments. A container unit is just one example of equipment which should use its radio/radios in intelligent way to save the energy its power source.

The container unit 101 may be further adapted to operate as a node of a message switching equipment. Then the container unit 101 is adapted to receive a message from another node of the message switching equipment. The container unit 101 transmits this message towards a receiver of the message, if it has the required connection.

Sometimes the container unit 101 does not have the required connection. For this situation the container unit is adapted to store received the message in the memory 106 until one of the connection set-up attempts results in the required/available connection or a certain time limit is reached. The certain time limit may be, for example, 24 hours.

In order to reduce the transmission costs the container unit may be adapted to send through the available connection information originated from at least two messages. For example, these messages may include the message 107 and the message received from another node of the message switching equipment.

Figure 2:
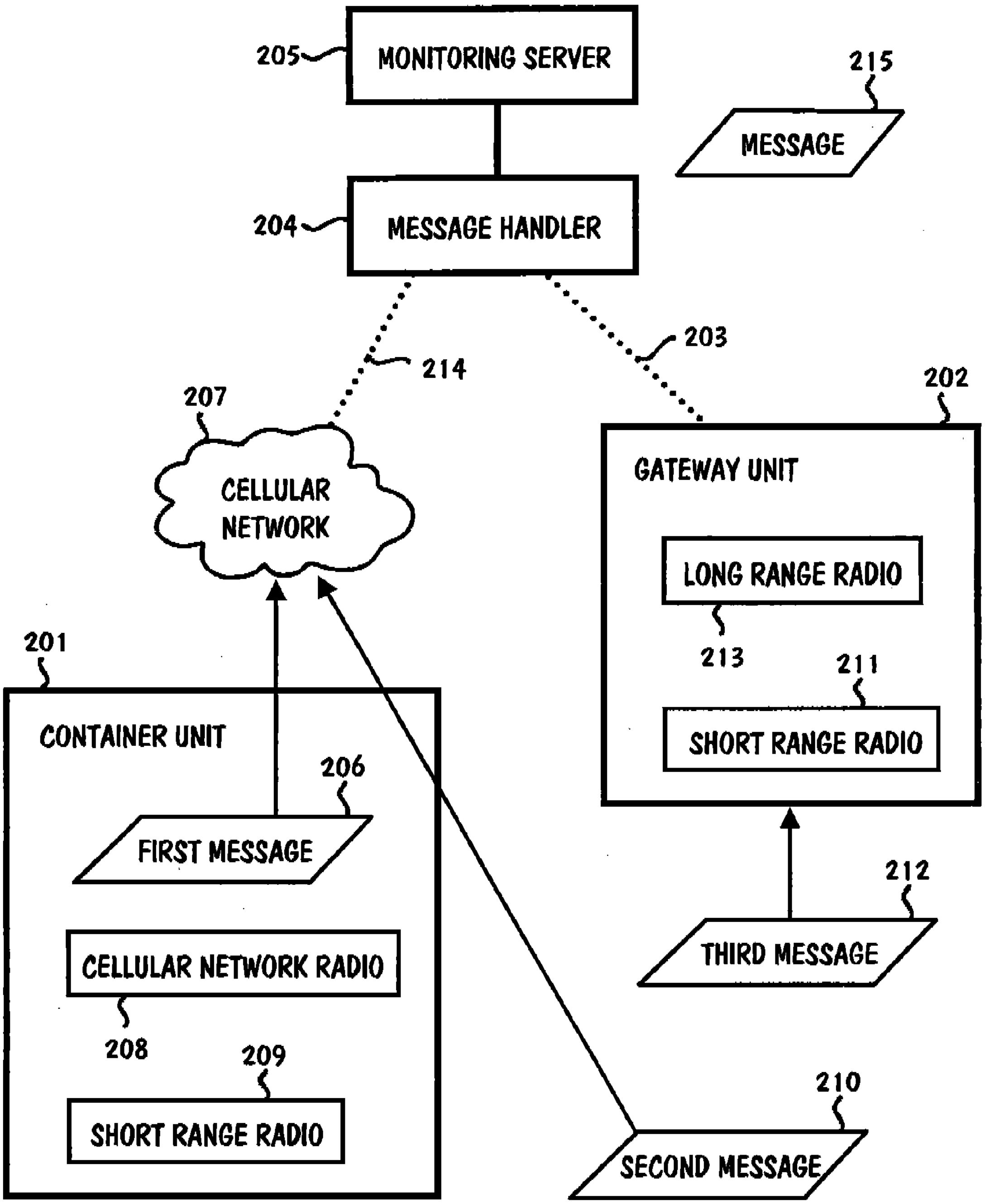
FIG. 2 shows a message switching equipment.

FIG. 2 shows the message switching equipment for transmitting messages between the monitoring server and the container units placed in containers. The message switching equipment comprises a container unit 201, a gateway unit 202 providing communication links 203, and a message handler 204 which is coupled to the monitoring server 205.

The message switching equipment is adapted to send a first message 206 from the container unit 201 via a cellular network 207 to the message handler 204 in response to an event, the event relating to a container in which the container unit 201 is placed.

In more detail, the first message 206 is sent through a cellular network radio 208 of the container unit 201.

The equipment is further adapted to receive through a short range radio 209 of the container unit 201 a second message 210 originated from one of the container units and transmit the second message 210 from the container unit 201 via the cellular network 207 to the message handler 204.

The equipment is further adapted to receive through a short range radio 211 of the gateway unit 202 a third message 212 and transmit the third message through the gateway unit 202 to the message handler 203. The third message 212 is originated from one of the container units.

In more detail, the third message 212 is transmitted through the communication links 203 provided by a long range radio 213 of the gateway unit 202 to the message handler 203. From point of view of the message switching equipment it is irrelevant from which container unit the third message 212 is originated, but it may be from the container unit 201.

The equipment is further adapted to receive the first message 206, the second message 210, and the third message 212 at the message handler 203.

As shown in FIG. 2 the message handler 204 receives the first message 206 and the second message 210 through the cellular network 207. The first message and the second message may be short messages. The communication links 214 between the cellular network 207 and the message handler 204 are preferably SMS-based or IP-based.

The message handler 204 can be implemented in various ways. The message handler can be implemented as software and this software is executed in the monitoring server 205.

Alternatively, the message handler 204 can be implemented as a plug-in unit that is connected to the same bus as the monitoring server 205.

Alternatively, the message handler 204 can be implemented as a server that is connected to the same local area network as the monitoring server 205.

In the following we discuss about certain options related to the container unit 201, the gateway unit 202, and the message handler 204.

The container unit 201 preferably corresponds to the container unit 101 shown in FIG. 1, i.e. it provides the same features.

The security of the message switching can be enhanced by encrypting the messages.

The container unit 201 is further adapted to encrypt the first message 206 with a public key of the monitoring server 205 before sending the first message. In addition, the second message 210 and the third message 212 are encrypted with the public key of the monitoring server.

Generally speaking, it is easier to send a message from a container unit to the monitoring server 205 than vice versa, because we may assume that the location of the monitoring server 205 is fixed. The container unit travels, instead, from a country to another country and from a harbour to another harbour.

The monitoring server 205 needs routing information to able to send a message to the container unit. Thus, the container unit 201 is adapted to add its container unit identifier to the first message 206 before sending the message.

The container unit 201 may further add to the first message 206 at least one container unit identifier identifying a candidate container unit through which the container unit is able send the first message. Sometimes there are a number of candidate container units through which messages can be sent. If the monitoring server 205 aims to send its message to the container unit 206, some of these candidate container units may provide an alternative transmission path to the container unit 206.

The container unit 201 is also adapted to add its container unit identifier to the second message 210 before transmitting it.

Also the third message transmitted by the gateway unit 202 may include one or more container unit identifiers. Therefore the first, the second, or the third message may include a set of container unit identifiers, the set disclosing at least one container unit.

Generally speaking, each container unit identifier is composed of characters, but it is possible that the set of container unit identifiers is composed of phone numbers, i.e. each container unit identifier is a phone number.

The gateway unit 202 is further adapted to add its gateway identifier to the third message 212 before transmitting it. The gateway identifier may be a satellite phone number.

When the received messages (206, 210, 212) include the set of container unit identifiers the message handler 204 is adapted to read the set from the messages (206, 210, 212) and store the set in a memory.

When the gateway unit 202 has added its gateway identifier to the third message 212 the message handler 204 is adapted to read the gateway identifier from the message 212 and store the gateway identifier in the memory.

The message handler 204 is further adapted to form a message 215, add routing information to the message 215, and send the message 215 to a certain container unit that sent the first, the second, or the third message to the monitoring server 205.

We may consider that the content of the message 215 comes form the monitoring server 205, but the message handler 204 forms the message to be sent.

The routing information is intended for those nodes which transmit the message 215 towards the receiver of the message 215, i.e. towards the certain container unit. The message switching equipment assumes that if the message 215 is transmitted through the same transmission path which the receiver of the message 215 used for its message (206, 210, or 212), the receiver obtains the message 215 with high probability.

The routing information written in the message 215 preferably includes the set of container unit identifiers, i.e. the set which the message handler 204 stored in the memory.

The routing information may further include the gateway identifier stored in the memory. When the message handler 204 sends the message 215 to the container unit which sent the third message 212, the routing information of the message 215 includes the gateway identifier.

The container unit 201 and the gateway unit 202 are further adapted to read the routing information from the message 215 sent and transmit the message 215 on the basis of the routing information towards the certain container unit.

The message handler is further adapted to encrypt the message 215 with a public key of the certain container unit before sending the message. The certain container unit is the unit that sent the first, the second, or the third message to the monitoring server 205.

The message handler is further adapted to sign the message 215 with the private key of the monitoring server 205 before sending the message. In other words, the message handler decrypts the message with the private key of the monitoring server. When the receiver of the message 215 decrypts the message with the public key of the monitoring server 205, the sender of the message it possible to authenticate. This way the receiver ensures that the message 215 is sent from the monitoring server.

Figure 3:
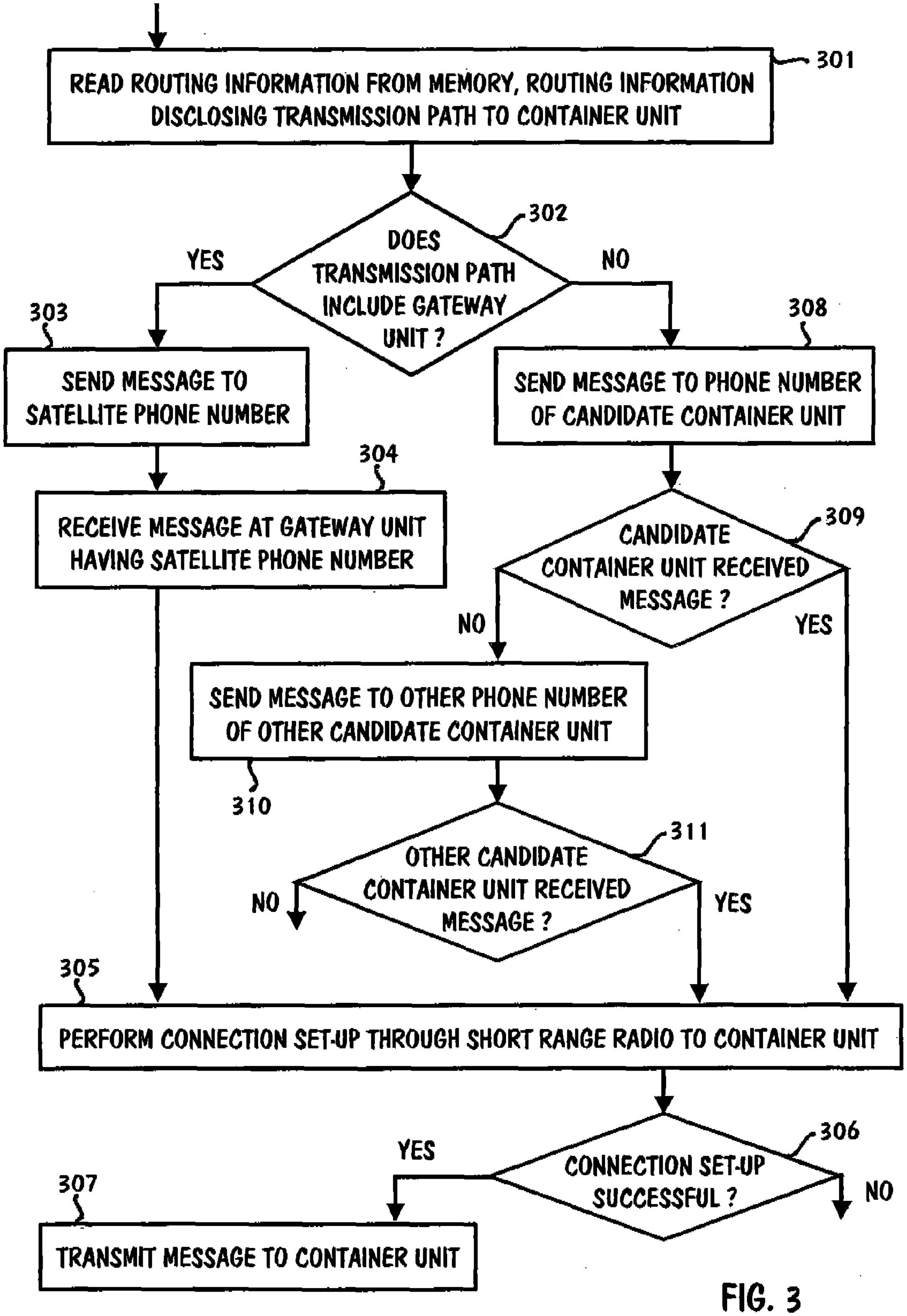
FIG. 3 shows a method for routing a message to a container unit.

FIG. 3 shows a method for routing a message to a container unit. In more detail, the method routes a message from a message handler to a container unit, the message including an identifier of the container unit. The container unit is assumed to include a short range radio and a cellular network radio. The method comprises the steps 301-307.

The performance of the method starts with the step of reading 301 at the message handler routing information from a memory, the routing information disclosing a transmission path to the container unit.

If the routing information indicates 302 that the transmission path includes a gateway unit having the satellite phone number, the performance of the method continues with the step of sending 303 the message with the routing information from the message handler to a satellite phone number disclosed in the routing information.

The gateway unit provides satellite communications services for container units when the container units are not able to use their cellular network radios. This is a typical situation, for example, at sea.

After sending 303 the message the performance of the method continues with the steps of receiving 304 the message at the gateway unit, performing 305 a connection set-up through a short range radio of the gateway unit to the container unit, and transmitting 307 the message from the gateway unit through the short range radio to the container unit when the connection set-up 306 succeeds.

The method may further comprise the step of sending 308 the message with the routing information from the message handler to a phone number disclosed in the routing information, if the routing information indicates 302 that the gateway unit is missing from the transmission path.

A container unit which is assumed to be capable to communicate with a specific container unit is termed a "candidate container unit". We may also consider that the specific container unit is available through the candidate container unit.

There may be a number of candidate container units and the routing information may include a number of phone numbers related to the candidate container units. One of the candidate container units has the phone number mentioned in step 308. The container unit to which the message handler sends the message has announced in some other way the candidate container units to the message handler.

If the routing information indicates 302 that the gateway unit is missing from the transmission path the method comprises the steps of performing 305 another connection set-up through a short range radio of the candidate container unit to the container unit when the candidate container unit having the phone number has received 309 the message and transmitting 307 the message from the candidate container unit to the container unit when this connection set-up succeeds.

If the candidate container unit failed to receive 309 the message, the method comprises the step of sending 310 the message with the routing information from the message handler to an other phone number disclosed in the routing information.

If another candidate container unit having the other phone number has received 311 the message the method comprises the steps of performing 305 another connection set-up through a short range radio of the other candidate container unit to the container unit, and transmitting 307 the message from the other candidate container unit to the container unit when this connection set-up succeeds.

If the other candidate container unit failed to receive 311 the message, there may be one or more candidate container units left and the message handler may try to send the message to one of them.

The phone number mentioned in step 308 and the other phone number mentioned in step 310 are preferably ENUM numbers specified by the IETF (internet engineering task force). RFC 3761 specified by the IETF concerns the ENUM numbers.

Also the satellite phone number mentioned in step 303 is preferably an ENUM number.

ENUM is a quite new communications method, thus it is discussed in the following.

ENUM can be considered as a method of referring to an Internet service through what looks to be a phone number. An ENUM number can be used to point to an email service, a messaging service, a Web page, or to making a call. When a user of a terminal has called to the ENUM number and the connection is established the email service or the messaging service can be used through the terminal, the Web page can be read, or the user of the terminal may speak with another person.

With ENUM, a phone number is translated into an IP address as follows. First, any area and country codes are added, if they are missing. Then any spaces and hyphens are removed, the digits are reversed, dots are placed between each digit, and finally the domain "164.arpa" is added.

For example, the mobile phone number (+44)07879 99999 would be translated to 9.9.9.9.9.9.7.8.7.4.4.e164.arpa The well-known numbering mechanism uses digits 0-9 to indicate country, area, service, mobility, etc. ITU (international telecommunication union) has specified the numbering mechanism in detail in E.164 standard.

The DNS (domain name system) maintains IP addresses and other URIs (uniforms resource identifiers). ENUM links the URIs with the phone numbers which are formed according to E.164 standard.

When a phone number is an ENUM number, it is dialed using SIP (Session Initiation Protocol) procedures. After dialing a so-called SIP user-agent deals with DNS NAPTR and DNS SRV records. These records are a way of redirecting requests from one URI to another URI. Therefore the method in accordance with the preferred embodiment can very freely route the message mentioned in step 301.

The method may utilize some addressing infrastructure such as "TITAN" (transactional IP telephony addressing & numbering) developed by NetNumber company.

TITAN can be considered as a software package which is configurable for address resolution services on a variety of hardware platforms and operating systems. It supports ENUM and the following communications protocols: SIP, SOAP (simple object access protocol) and a number of SS7/C7 (Signalling System No. 7) protocols such as GSM.

TITAN enables the migration of SMS traffic from an SS7 network onto an IP-based transport and addressing infrastructure. In more detail, it supports the SMPP (Short Message Peer to Peer) tunnelling.

The SMS address resolution of TITAN operates as follows.

1. A terminal sends an SMS message using a phone number as the destination address.
2. The originating SMS Centre or SMS Gateway server queries a TITAN server to obtain an identifier which is termed a "portability-corrected service provider ID", i.e. a "portability corrected SPID".
3. The SMS Gateway uses the portability-corrected SPID to select an appropriate route for delivering the SMS message to a GSM/CDMA operator or a fixed-line operator.

The satellite phone number may be provided by one of the following communications networks: Inmarsat, Globalstar, Iridium, Thuraya. In addition to these, there may be other appropriate satellite communications networks available in the future.

The coverage areas and the services of the present satellite networks are shortly discussed in the following.

Inmarsat is especially intended for maritime communications and safety services. The satellites of Inmarsat form the mainstay of the Global Maritime Distress and Safety System (GMDSS) which is able to connect mariners around the world to the nearest rescue centre. Inmarsat covers all the major shipping lanes.

Globalstar provides communications capabilities in over 120 countries and it covers many shipping lanes.

Iridium Satellite LLC is the only provider of truly global satellite services with complete coverage of the earth. The coverage includes oceans. The Iridium constellation consists of 66 low-earth orbiting (LEO) cross-linked satellites. The constellation operates as a fully meshed network and is the largest commercial satellite constellation in the world.

Thuraya expands the coverage area of existing terrestrial communications systems. It covers some shipping lanes. Thuraya's dual mode (GSM and satellite) handsets integrate terrestrial and satellite services, expanding the boundaries of local telecom providers.

The satellite telecommunications services offered by Thuraya include the following: voice (GSM quality), fax (at 9.6 kbps), data (at 9.6 kbps), messaging (GSM short message service), and location determination (within 100 meters accuracy using GPS).

The method in accordance with the preferred embodiment may further comprise a step of storing the message in a node situated between the message handler and the container unit until the message is successfully transmitted to the container unit or a certain time limit is reached. The node is, for example, the gateway unit, the candidate container unit, or an SMS centre. The node may be the SMS centre, if the message is an SMS message. However, the message can also be other type of message.

When the message is stored in the node, the node usually tries to transmit the message a number of times to the container unit.

Sometimes the container unit may receive the same message twice. Then the container unit removes the duplicate message. The message should include a message identifier in order that the container unit is capable to detect the duplicate message.

The method in accordance with the preferred embodiment preferably uses a routing directory shown in the next figure.

Figure 4:
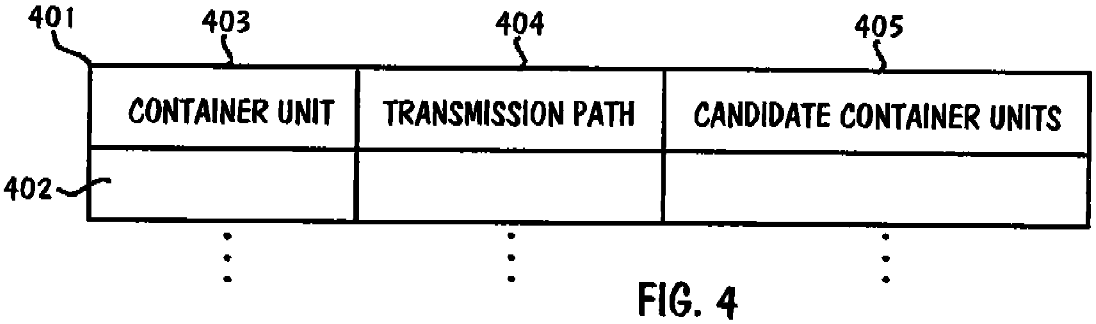
FIG. 4 shows a routing directory.

FIG. 4 shows the routing directory for storing routing information. The routing directory 401 includes at least one data item intended for routing a message from a message handler via at least one wide area network to a container unit.

An data item 402 of the routing directory 401 comprises the following sub-items: a sub-item of "container unit" 403, a sub-item of "transmission path" 404, and a sub-item of "candidate container units" 405.

The sub-item of "container unit" 403 discloses the above-mentioned container unit for which the item of the routing information is written in the routing directory.

The sub-item of "transmission path" 404 discloses a transmission path through which at least one previous message is successfully transmitted between the container unit and a message handler.

The sub-item of "candidate container units" 405 discloses at least one candidate container unit through which the message to be sent from the message handler is assumed to be transmissible to the container unit.

Any of the above-mentioned sub-items includes at least one of the following identifiers: a phone number, an ENUM number, a URI, or some other unique character string.

Figure 5A:
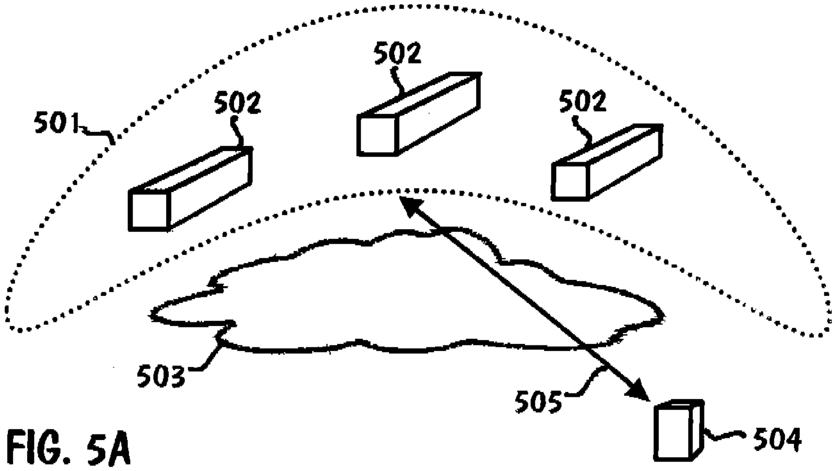
FIG. 5A shows a system for monitoring containers.

FIG. 5A shows a system for monitoring containers. The system comprises a plurality 501 of container units placed in the containers 502 to be monitored. The system further comprises a message switching equipment corresponding to the message switching equipment shown in FIG. 2. This equipment includes at least one container unit placed in one of the containers 502, a gateway unit, and a message handler 504. The gateway unit can be considered to be a part of a communications network 503. The system usually includes a plurality of gateway units placed in ships. Thus, the system may include a number of different types of nodes.

The message handler 504 related to the message switching equipment is preferably adapted to use the method shown in FIG. 3.

The message handler 504 or any other node of the system is preferably adapted to use a routing directory corresponding to the routing directory 401 shown in FIG. 4.

At least one container unit belonging to the plurality 501 of container units preferably corresponds to the container unit 101 which is shown in FIG. 1 and described in the text related to FIG. 1.

The system is preferably implemented so that the communication 505 between the message handler 504 and the plurality 501 of container units causes costs as less as possible.

One way to reduce the communication costs is to situate the message handler 504 in a country in which a cellular network operator provides low-priced subscriptions. In more detail, the subscriptions should be such that they can send and receive SMS-messages with low costs in all over the world. Thus, the cellular network operator should have the roaming contracts with very many cellular network operators.

Another way to reduce the communication costs is to use ENUM numbers. Then it may be possible to route a message via the Internet free of charge to a container unit. However, IP-based messaging down to the container unit is not always possible.

Figure 5B:
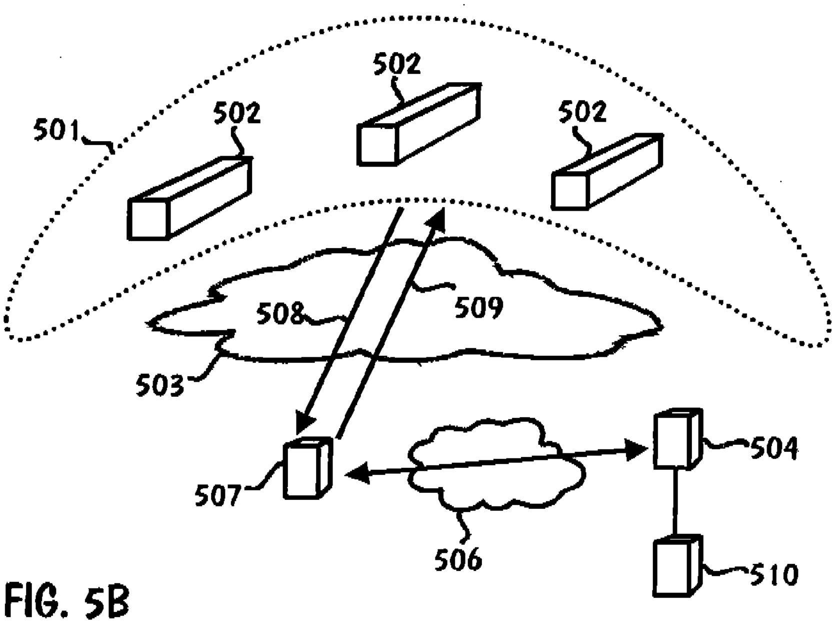
FIG. 5B shows another embodiment of the system in which messages are transmitted via globally distributed mediator units.

FIG. 5B shows another embodiment of the system in which messages are transmitted via globally distributed mediator units. When compared to the system of FIG. 5A the system of FIG. 5B further comprises at least one mediator unit connected through the Internet 506 to the message handler 504.

A mediator unit 507 includes at least one radio through which the system is adapted to receive a message 508 from the plurality of container units 501 and send another message 509 to the plurality of container units 501. The messages 508 and 509 are transmitted through the message switching equipment.

The radio of the mediator unit 507 is one of the following radios: a cellular network radio, a short range radio, a long range radio, a satellite radio, or a WAN (wide area network) radio.

In the following the message transmission is discussed in more detail.

The system receives at the mediator unit 507 the message 508 sent from a container unit belonging to the plurality of container units 501 and transmitted via a cellular network and through the message switching equipment and the mediator unit 506 to the message handler 504. This requires that the mediator unit 506 is equipped with a cellular network radio. The message 508 may be the first message 206 or the second message 210 shown in FIG. 2 and the above-mentioned cellular network may be the cellular network 207 shown in FIG. 2

Alternatively, the system receives at the mediator unit 507 the message 508 which is transmitted via a gateway unit. This requires that the mediator unit 507 is equipped with a radio capable to communicate with the gateway unit. The message 508 may be the third message 212 shown in FIG. 2 and the gateway unit may be the gateway unit 202 shown in FIG. 2

The system sends the message 509 to a container unit belonging the plurality of container units 501 either via the cellular network or via the gateway unit.

In FIG. 5B the message handler 504 is connected to one monitoring server (510), but it could be connected to a plurality of monitoring servers. The connections may be Internet-based.

Also the system shown in FIG. 5B is preferably implemented so that the communication between the message handler 504 and the plurality 501 of container units causes costs as less as possible.

One way to reduce the communication costs is to situate the mediator unit 507 in a country in which a cellular network operator provides low-priced subscriptions.

Another way to reduce the communication costs is to situate mediator units in such sites where they shorten expensive transmission routes. For example, if a message is sent via a satellite communications network to a container unit located on the other side of the earth, the transmission costs are relatively high. If the message can be transmitted free of charge to a mediator unit locating quite near the container unit, only the last transmission link causes costs.

The container unit, the message switching equipment, the routing method, the routing directory, and the system for monitoring containers can be implemented in various ways which are, however, obvious to a person skilled in the art because of the person's professional ability and the ideas described in this patent application.

The invention claimed is:

1. A container unit capable of communicating with a monitoring server, the container unit comprising:

a cellular network radio;

a short range radio;

a power source;

a wake-up unit;

a memory;

a connection set-up logic stored in the memory;

wherein the container unit is configured to form a message in response to an event, the event relating to a container in which the container unit is placed;

perform on the basis of the connection set-up logic at least two of the following connection set-up attempts:

a) a connection through the short range radio directly to a gateway unit providing communication links between the container unit and the monitoring server;

b) a connection through the short range radio to the gateway unit via at least one other container unit which is placed in another container;

c) a connection through the cellular network radio to a base station of a cellular network; and, d) a connection through the short range radio directly or via at least one other container unit to such container unit which is capable to communicate with the base station;

stop the connection set-up attempts when a number of the connection set-up attempts reaches a certain limit;

start the connection set-up attempts when the wake-up unit responsive to movements has detected a movement of the container in which the container unit is placed; and send the message through an available connection towards the monitoring server when any of the connection set-up attempts results in the available connection to the gateway unit or to the base station of the cellular network, the container unit being further adapted to provide the monitoring server with routing information enabling it to communicate with the container unit by performing a step selected from a list containing:

adding to the message its own container unit identifier;

adding to the message at least one container unit identifier identifying a candidate container unit through which the container unit is able to send the message;

adding its own container unit identifier to a second message received from another container unit before relaying said message to the available connection; and, any combination thereof .

2. The container unit as in claim 1, wherein the connection set-up logic further defines criteria for the order, the criteria comprising at least one of the following criteria: costs, latency, throughput, a number of hops, energy consumption, or a combination thereof.

3. The container unit as in claim 1, wherein the event is one of following events: an event detected by a sensor connected to the container unit, an event initiated by a message sent from the monitoring server, or a combination thereof.

4. The container unit as in claim 1, wherein the container unit further comprises a satellite locator.

5. The container unit as in claim 1, wherein the container unit comprises a node of a message switching equipment and wherein the container unit is configured to receive a message from another node of the message switching equipment; and, store the received message in the memory until one of the connection set-up attempts results in the available connection or a certain time limit is reached.

* * * * *